(12) United States Patent
Mitzel et al.

(10) Patent No.: US 11,467,172 B1
(45) Date of Patent: Oct. 11, 2022

(54) DISPENSING ASSEMBLY TO FACILITATE DISPENSING OF FLUID FROM A SAMPLE CYLINDER AND RELATED METHODS

(71) Applicant: MARATHON PETROLEUM COMPANY LP, Findlay, OH (US)

(72) Inventors: Donald J. Mitzel, Findlay, OH (US); Gregory D. Bender, IV, Findlay, OH (US); Anthony D. Anderson, Findlay, OH (US); Alex M. Markins, Findlay, OH (US); John J. Langenfeld, Findlay, OH (US); Tayler M. Justice, Findlay, OH (US); Jason M. Chauvin, Findlay, OH (US); Michael Fauchaux, Findlay, OH (US); Ronald Steib, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 17/841,992

(22) Filed: Jun. 16, 2022

Related U.S. Application Data

(60) Provisional application No. 63/261,874, filed on Sep. 30, 2021, provisional application No. 63/261,566, filed on Sep. 23, 2021.

(51) Int. Cl.
*G01N 35/00* (2006.01)
*G01M 3/28* (2006.01)
*G01N 35/10* (2006.01)

(52) U.S. Cl.
CPC .... *G01N 35/00623* (2013.01); *G01M 3/2815* (2013.01); *G01N 35/1004* (2013.01)

(58) Field of Classification Search
CPC ......... G01N 35/00623; G01N 35/1004; G01N 3/2815
See application file for complete search history.

(56) References Cited

U.S. PATENT DOCUMENTS

| | | | |
|---|---|---|---|
| 5,301,560 A | 4/1994 | Anderson et al. | |
| 5,361,643 A | 11/1994 | Boyd et al. | |
| 5,431,067 A | 7/1995 | Anderson et al. | |
| 5,433,120 A | 7/1995 | Boyd et al. | |
| 6,435,279 B1 * | 8/2002 | Howe | E21B 49/086 166/336 |
| 7,686,280 B2 | 3/2010 | Lowery | |

(Continued)

*Primary Examiner* — Nathaniel J Kolb
(74) *Attorney, Agent, or Firm* — Womble Bond Dickinson (US) LLP

(57) ABSTRACT

A dispensing assembly and related methods to facilitate dispensing of a fluid sample from a sample cylinder may include a sensor connected to one or more of conduits of the dispensing assembly and configured to provide indication of a leak in the conduits. A cap assembly may include a cap body and one or more cap conduits positioned to engage with a flush fluid source and provide fluid flow between the flush fluid source and a flush conduit. The cap assembly further may include a first quick connect coupler for connection and disconnection to a second quick connect coupler connected to a flush conduit. A pressure control device may be provided to prevent damage resulting from pressure to containers containing flush fluid. Inlet and outlet conduits connecting to the sample cylinder may configured to be flexible and align with corresponding connectors on the sample cylinder.

26 Claims, 9 Drawing Sheets

(56) References Cited

U.S. PATENT DOCUMENTS

| | | |
|---|---|---|
| 2015/0034599 A1 | 2/2015 | Hunger et al. |
| 2017/0115190 A1* | 4/2017 | Hall .......................... F17C 7/00 |
| 2018/0080958 A1 | 3/2018 | Marchese et al. |
| 2021/0033631 A1* | 2/2021 | Field .................. G01N 35/1097 |
| 2021/0181164 A1* | 6/2021 | Shirkhan .............. G01N 30/465 |

* cited by examiner

DISPENSING ASSEMBLY TO FACILITATE DISPENSING OF FLUID FROM A SAMPLE CYLINDER AND RELATED METHODS

PRIORITY CLAIM

This U.S. Non-Provisional patent application claims priority to and the benefit of U.S. Provisional Application No. 63/261,874, filed Sep. 30, 2021, titled "DISPENSING ASSEMBLY TO FACILITATE DISPENSING OF FLUID FROM A SAMPLE CYLINDER AND RELATED METHODS," and U.S. Provisional Application No. 3/261,566, filed Sep. 23, 2021, titled "DISPENSING ASSEMBLY TO FACILITATE DISPENSING OF FLUID FROM A SAMPLE CYLINDER AND RELATED METHODS," the disclosures of which are incorporated herein.

TECHNICAL FIELD

The present disclosure relates to dispensing assemblies to facilitate dispensing of fluid and related methods and, more particularly, to dispensing assemblies to facilitate dispensing of fluid from sample cylinders and related methods.

BACKGROUND

During many chemical manufacturing processes, it may be advisable to periodically determine one or more properties of a fluid at various points throughout the process. For example, during a petroleum refining process, in order to properly control various stages of the process, it may be advisable to determine one or more properties of a fluid associated with the process in order to ensure that the process is proceeding as desired. For example, during an alkylation process, it may be advisable to determine one or more properties associated with catalysts that aid the process. Such catalysts may include, for example, aluminum chloride, sulfuric acid, or hydrofluoric acid. In such processes, the strength of the catalyst reduces over time and may absorb moisture, which reduces the effectiveness of the catalyst in promoting the process. As a result, it may be desirable to periodically test the catalyst by removing a fluid sample from the process.

Fluid samples may be collected in a sample cylinder, which may be designed to safely contain the fluid sample until it is tested. In order to safely remove the fluid sample from the sample cylinder for testing, a dispensing system may be used to open and convey the fluid sample to a testing receptacle, such as, for example, a container with a septum closure, which may be used to transport the fluid sample to a testing apparatus such as, for example, a titration testing apparatus. A testing receptacle such as a container with a septum closure may be used, for example, when the fluid sample is volatile, presents a potential hazard if released to the atmosphere, or is sensitive to absorption of air or atmospheric moisture.

Some systems for dispensing a fluid sample may present several potential drawbacks. For example, some systems may be designed to use pressure to force the fluid sample from a sample cylinder in which the fluid sample has been collected, and into a sample receptacle via a series of fluid lines, connections, and valves. It may be difficult, however, to determine whether the system has any leaks. This may be detrimental when, for example, the fluid being tested is volatile or presents a potential hazard if released into the atmosphere. In addition, some systems may need to be cleaned between dispensing of different fluid samples in order to prevent contamination of later-tested fluid samples. Thus, some systems may be designed to force solvent and/or gas through portions of the system in an attempt to clean the system prior to being used to dispense another fluid sample for testing. It may be cumbersome, however, to refill or replace solvent containers, particularly when the laboratory technician must wear bulky protective gear including protective gloves. In addition, it may be desirable to switch solvent types. This may prove difficult with some systems that may require un-attaching one solvent container from the system and replacing it with another solvent container including a different solvent. Further, in some dispensing systems, it may be necessary to manually connect and disconnect various fluid line fittings, which may lead unsecure connections and leaks at the fittings.

Accordingly, Applicant has recognized a need for dispensing systems to facilitate dispensing a fluid sample from a sample cylinder and related methods that mitigate or eliminate potential drawbacks with dispensing systems. The present disclosure may address one or more of the above-referenced drawbacks, as well as other possible drawbacks.

SUMMARY

As referenced above, Applicant has recognized that it may be desirable to provide dispensing systems to facilitate dispensing a fluid sample from a sample cylinder and related methods that mitigate or eliminate potential drawbacks with dispensing systems. For example, Applicant has recognized that it may be desirable to provide a way to test the dispensing system for leaks, which may be critical when handling certain fluid samples. In addition, Applicant has recognized that it may be desirable to provide a dispensing system in which it is relatively easier to replenish or change solvent containers. Moreover, Applicant has recognized that it may be desirable to provide a dispensing system having connections that are relatively easier operate, for example, having fluid line connections that are more easily and securely connected and disconnected or valves and regulators that are more easily operated.

The present disclosure generally is directed to dispensing assemblies to facilitate dispensing of fluid samples from sample cylinders and related methods that may address one or more of the above-mentioned potential drawbacks, as well as possibly others. For example, in some embodiments, a dispensing assembly to facilitate dispensing of a fluid from a sample cylinder may include a support and a sample fixture assembly connected to the support and positioned to receive a sample cylinder containing a fluid sample. The dispensing assembly also may include a purge conduit positioned to receive a flow of a purge fluid and provide fluid flow to the sample cylinder, and a flush conduit positioned to receive a flow of a flush fluid and provide fluid flow to the sample cylinder. The dispensing assembly further may include an inlet conduit connected to one or more of the purge conduit or the flush conduit and positioned provide fluid flow to the sample cylinder, and a sensor connected to one or more of the purge conduit, the flush conduit, or the inlet conduit and positioned to provide an indication of a leak in the one or more of the purge conduit, the flush conduit, or the inlet conduit.

In some embodiments, a dispensing assembly to facilitate dispensing of a fluid from a sample cylinder may include a support and a sample fixture assembly connected to the support and positioned to receive a sample cylinder containing a fluid sample. The dispensing assembly further may include a flush conduit positioned to receive a flow of flush fluid from a flush fluid source and provide fluid flow to the sample cylinder. The flush conduit may include a cap assembly including a cap body positioned to be engaged with the flush fluid source, and a cap conduit positioned provide fluid flow between the flush fluid source and the flush conduit. The cap assembly also may include a quick connect coupler connected to the cap conduit and positioned to be connected to a second quick connect coupler connected to the flush conduit.

According to some embodiments, a dispensing assembly to facilitate dispensing of a fluid from a sample cylinder may include a support and a sample fixture assembly connected to a first side of the support and positioned to receive a sample cylinder containing a fluid sample. The dispensing assembly further may include a purge conduit positioned to receive a flow of purge fluid and provide fluid flow to the sample cylinder, and a pressure regulator connected to the purge conduit and positioned to regulate pressure in the purge conduit, the pressure regulator being connected to the first side of the support.

In some embodiments, a dispensing assembly to facilitate dispensing of a fluid from a sample cylinder may include a support, and a sample fixture assembly connected to the support and positioned to receive a sample cylinder containing a fluid sample. The dispensing assembly further may include an inlet conduit connector positioned to be connected to the sample cylinder to provide fluid flow to the sample cylinder. The inlet conduit may include a straight inlet segment defining an inlet conduit axis, the straight inlet segment being connected to the inlet conduit connector. The inlet conduit further may include a curved inlet segment connected to the straight inlet segment, the curved inlet segment and the straight inlet segment being positioned such that the inlet conduit axis remains substantially parallel to a cylinder inlet axis of a sample cylinder inlet coupling of the sample cylinder as the curved inlet segment flexes.

According to some embodiments, a flush inlet for a dispensing assembly to facilitate dispensing of a fluid from a sample cylinder may include a cap assembly including a cap body positioned to be engaged with a flush fluid source, and a cap conduit positioned provide fluid flow between the flush fluid source and a flush conduit. The flush inlet further may include a first quick connect coupler connected to the cap conduit and positioned to be connected to a second quick connect coupler connected to a flush conduit through which flush fluid flows.

In some embodiments, a method for leak-testing one or more fluid conduits associated with a dispensing assembly to facilitate dispensing of a fluid from a sample cylinder may include closing one or more of a purge valve or a flush valve of the dispensing assembly, the one of more of the purge valve or flush valve being connected to the one or more fluid conduits at a position remote from a source of pressurized fluid. The method further may include supplying pressurized fluid from the pressurized fluid source to the one or more fluid conduits, and monitoring a sensor connected to the one or more conduits, the sensor being positioned to provide an indication of a leak in the one or more fluid conduits.

According to some embodiments, a method for replacing a first container providing a first flush fluid source for a dispensing assembly to facilitate dispensing of a fluid from a sample cylinder, may include closing a valve between a pressurized fluid source and the first container to block flow of pressurized fluid from the pressurized fluid source and the first container. The method further may include disconnecting a first quick connect coupler coupling a fluid conduit to the first container, and separating the first container from the dispensing assembly. The method also may include moving a second container providing a second flush fluid source into a position within reach of the fluid conduit, and connecting a second quick connect coupler coupling the fluid conduit to the second container.

In some embodiments, a method for operating a dispensing assembly to facilitate dispensing of a fluid from a sample cylinder may include connecting a sample cylinder containing a fluid sample to a fixture assembly of the dispensing assembly, the fixture assembly being positioned to secure the sample cylinder and facilitate extraction of at least a portion of the fluid sample from the sample cylinder. The method further may include connecting an inlet conduit and an outlet conduit to inlet and outlet couplings of the sample cylinder, and leak-testing one or more fluid conduits associated with the dispensing assembly. The method also may include positioning a sample receptacle for receiving the at least a portion of the fluid sample via the outlet conduit. The method further may include opening the sample cylinder via operation of an actuator associated with the fixture assembly to release the at least a portion of the fluid sample, and opening an outlet valve connected to the outlet conduit to supply the at least a portion of the fluid sample to the sample receptacle.

According to some embodiments, a dispensing assembly to facilitate dispensing of a fluid from a sample cylinder may include a support defining a front side and a back side, and a sample fixture assembly connected to the front side of the support and positioned to receive a sample cylinder containing a fluid sample. The dispensing assembly also may include a purge inlet associated with the support and positioned to receive a purge fluid from a first pressurized fluid source, and a purge conduit connected to the purge inlet to receive a flow of the purge fluid and provide fluid flow between the purge inlet and the sample cylinder. The dispensing assembly further may include a purge valve connected to the purge conduit and positioned to switch between a closed condition blocking flow of the purge fluid and an open condition allowing flow of the purge fluid through the purge valve. The dispensing assembly also may include a purge regulator connected to the purge conduit and positioned to control a purge pressure associated with the purge fluid in the purge conduit. The dispensing assembly still further may include a flush inlet associated with the support and positioned to receive a flush fluid from one or more of a first flush fluid source or a second flush fluid source, and a flush conduit connected to the flush inlet and positioned to receive a flow of the flush fluid and provide fluid flow between the flush inlet and the sample cylinder. The dispensing assembly also may include a flush valve connected to the flush conduit and positioned to switch between a closed condition blocking flow of the flush fluid from one or more of the first flush fluid source or the second flush fluid source and an open condition allowing flow of the flush fluid from one or more of the first flush fluid source or the second flush fluid source through the flush valve. The dispensing assembly further may include an inlet conduit connected to the front side of the support and one or more of the purge conduit or the flush conduit and positioned provide fluid flow to the sample cylinder. The dispensing assembly also may include an inlet valve connected to the inlet conduit and positioned to switch between a closed condition blocking flow of fluid to the sample cylinder and an open condition allowing flow of fluid through the inlet valve to the sample cylinder. The dispensing assembly further may include an inlet conduit connector connected to the inlet valve and positioned to be connected to the sample cylinder to provide fluid flow to the sample cylinder. The dispensing assembly also may include an outlet conduit connected to the front side of the support and positioned to provide fluid flow between the sample cylinder and a sample receptacle positioned to receive the sample fluid. The dispensing assembly further may include an outlet conduit connector connected to the outlet conduit and positioned to be connected to the sample cylinder to provide fluid flow from the sample cylinder, and an outlet valve connected to the outlet conduit and positioned to switch between a closed condition blocking flow of fluid from the sample cylinder and an open condition allowing flow of fluid through the outlet valve from the sample cylinder to the sample receptacle. The dispensing assembly also may include a sensor associated with the support and viewable from the front side of the support. The sensor may be connected to one or more of the flush conduit or the inlet conduit and positioned to provide an indication of a leak in the one or more of the purge conduit, the flush conduit, or the inlet conduit.

According to some embodiments, a dispensing assembly to facilitate dispensing of a fluid from a sample cylinder may include a support defining a front side and a back side, and a sample fixture assembly connected to the front side of the support and positioned to receive a sample cylinder containing a fluid sample. The dispensing assembly further may include a purge inlet associated with the support and positioned to receive a purge fluid from a first pressurized fluid source, and a purge conduit connected to the purge inlet to receive a flow of the purge fluid and provide fluid flow between the purge inlet and the sample cylinder. The dispensing assembly also may include a purge valve connected to the purge conduit and positioned to switch between a closed condition blocking flow of the purge fluid and an open condition allowing flow of the purge fluid through the purge valve, and a purge regulator connected to the purge conduit and positioned to control a purge pressure associated with the purge fluid in the purge conduit. The dispensing assembly further may include a flush inlet associated with the support and positioned to receive a flush fluid from one or more of a first flush fluid source or a second flush fluid source. The dispensing assembly also may include a flush conduit connected to the flush inlet and positioned to receive a flow of the flush fluid and provide fluid flow between the flush inlet and the sample cylinder. The dispensing assembly further may include a flush valve connected to the flush conduit and positioned to switch between a closed condition blocking flow of the flush fluid from one or more of the first flush fluid source or the second flush fluid source and an open condition allowing flow of the flush fluid from one or more of the first flush fluid source or the second flush fluid source through the flush valve. The dispensing assembly also may include an inlet conduit connected to the front side of the support and one or more of the purge conduit or the flush conduit and positioned provide fluid flow to the sample cylinder, and an inlet valve connected to the inlet conduit and positioned to switch between a closed condition blocking flow of fluid to the sample cylinder and an open condition allowing flow of fluid through the inlet valve to the sample cylinder. The dispensing assembly further may include an inlet conduit connector connected to the inlet valve and positioned to be connected to the sample cylinder to provide fluid flow to the sample cylinder. The dispensing assembly also may include an outlet conduit connected to the front side of the support and positioned to provide fluid flow between the sample cylinder and a sample receptacle positioned to receive the sample fluid, and an outlet conduit connector connected to the outlet conduit and positioned to be connected to the sample cylinder to provide fluid flow from the sample cylinder. The dispensing assembly further may include an outlet valve connected to the outlet conduit and positioned to switch between a closed condition blocking flow of fluid from the sample cylinder and an open condition allowing flow of fluid through the outlet valve from the sample cylinder to the sample receptacle. The flush inlet may include a cap assembly including a cap body positioned to be engaged with the one or more of the first flush fluid source or the second flush fluid source. The cap assembly further may include a first cap conduit positioned provide fluid flow between the first flush fluid source and the flush conduit, and a first quick connect coupler connected to the first cap conduit and positioned to be connected to a second quick connect coupler connected to the flush conduit.

In some embodiments, a dispensing assembly to facilitate dispensing of a fluid from a sample cylinder may include a support defining a front side and a back side, and a sample fixture assembly connected to the front side of the support and positioned to receive a sample cylinder containing a fluid sample. The dispensing assembly further may include a purge inlet associated with the support and positioned to receive a purge fluid from a first pressurized fluid source, and a purge conduit connected to the purge inlet to receive a flow of the purge fluid and provide fluid flow between the purge inlet and the sample cylinder. The dispensing assembly also may include a purge valve connected to the purge conduit and positioned to switch between a closed condition blocking flow of the purge fluid and an open condition allowing flow of the purge fluid through the purge valve, and a purge regulator connected to the purge conduit and positioned to control a purge pressure associated with the purge fluid in the purge conduit. The dispensing assembly further may include a flush inlet associated with the support and positioned to receive a flush fluid from one or more of a first flush fluid source or a second flush fluid source, and a flush conduit connected to the flush inlet and positioned to receive a flow of the flush fluid and provide fluid flow between the flush inlet and the sample cylinder. The dispensing assembly also may include a flush valve connected to the flush conduit and positioned to switch between a closed condition blocking flow of the flush fluid from one or more of the first flush fluid source or the second flush fluid source and an open condition allowing flow of the flush fluid from one or more of the first flush fluid source or the second flush fluid source through the flush valve. The dispensing assembly also may include an inlet conduit connected to the front side of the support and one or more of the purge conduit or the flush conduit and positioned provide fluid flow to the sample cylinder, and an inlet valve connected to the inlet conduit and positioned to switch between a closed condition blocking flow of fluid to the sample cylinder and an open condition allowing flow of fluid through the inlet valve to the sample cylinder. The dispensing assembly further may include an inlet conduit connector connected to the inlet valve and positioned to be connected to the sample cylinder to provide fluid flow to the sample cylinder. The dispensing assembly also may include an outlet conduit connected to the front side of the support and positioned to provide fluid flow between the sample cylinder and a sample receptacle positioned to receive the sample fluid, and an outlet conduit connector connected to the outlet conduit and positioned to be connected to the sample cylinder to provide fluid flow from the sample cylinder. The dispensing assembly further may include an outlet valve connected to the outlet conduit and positioned to switch between a closed condition blocking flow of fluid from the sample cylinder and an open condition allowing flow of fluid through the outlet valve from the sample cylinder to the sample receptacle. The dispensing assembly also may include a pressure regulator connected to the purge conduit and positioned to regulate pressure in the purge conduit. The pressure regulator may be connected to the support, such that the pressure regulator is accessible from the front side of the support.

According to some embodiments, a dispensing assembly to facilitate dispensing of a fluid from a sample cylinder, may include a support defining a front side and a back side, and a sample fixture assembly connected to the front side of the support and positioned to receive a sample cylinder containing a fluid sample. The dispensing assembly further may include a purge inlet associated with the support and positioned to receive a purge fluid from a first pressurized fluid source, and a purge conduit connected to the purge inlet to receive a flow of the purge fluid and provide fluid flow between the purge inlet and the sample cylinder. The dispensing assembly also may include a purge valve connected to the purge conduit and positioned to switch between a closed condition blocking flow of the purge fluid and an open condition allowing flow of the purge fluid through the purge valve, and a purge regulator connected to the purge conduit and positioned to control a purge pressure associated with the purge fluid in the purge conduit. The dispensing assembly further may include a flush inlet associated with the support and positioned to receive a flush fluid from one or more of a first flush fluid source or a second flush fluid source, and a flush conduit connected to the flush inlet and positioned to receive a flow of the flush fluid and provide fluid flow between the flush inlet and the sample cylinder. The dispensing assembly also may include a flush valve connected to the flush conduit and positioned to switch between a closed condition blocking flow of the flush fluid from one or more of the first flush fluid source or the second flush fluid source and an open condition allowing flow of the flush fluid from one or more of the first flush fluid source or the second flush fluid source through the flush valve. The dispensing assembly further may include an inlet conduit connected to the front side of the support and one or more of the purge conduit or the flush conduit and positioned provide fluid flow to the sample cylinder, and an inlet valve connected to the inlet conduit and positioned to switch between a closed condition blocking flow of fluid to the sample cylinder and an open condition allowing flow of fluid through the inlet valve to the sample cylinder. The dispensing assembly also may include an inlet conduit connector connected to the inlet valve and positioned to be connected to the sample cylinder to provide fluid flow to the sample cylinder, and an outlet conduit connected to the front side of the support and positioned to provide fluid flow between the sample cylinder and a sample receptacle positioned to receive the sample fluid. The dispensing assembly further may include an outlet conduit connector connected to the outlet conduit and positioned to be connected to the sample cylinder to provide fluid flow from the sample cylinder, and an outlet valve connected to the outlet conduit and positioned to switch between a closed condition blocking flow of fluid from the sample cylinder and an open condition allowing flow of fluid through the outlet valve from the sample cylinder to the sample receptacle. The inlet conduit may include a straight inlet segment defining an inlet conduit axis. The straight inlet segment may be connected to the inlet conduit connector. The inlet conduit also may include a curved inlet segment connected to the flush conduit and the straight inlet segment. The curved inlet segment and the straight inlet segment may be positioned such that the inlet conduit axis remains substantially parallel to a cylinder inlet axis of a sample cylinder inlet coupling of the sample cylinder as the curved inlet segment flexes.

In some embodiments, a dispensing assembly to facilitate dispensing of a fluid from a sample cylinder, may include a support defining a front side and a back side, and a sample fixture assembly connected to the front side of the support and positioned to receive a sample cylinder containing a fluid sample. The dispensing assembly also may include a purge inlet associated with the support and positioned to receive a purge fluid from a first pressurized fluid source, and a purge conduit connected to the purge inlet to receive a flow of the purge fluid and provide fluid flow between the purge inlet and the sample cylinder. The dispensing assembly further may include a purge valve connected to the purge conduit and positioned to switch between a closed condition blocking flow of the purge fluid and an open condition allowing flow of the purge fluid through the purge valve, and a purge regulator connected to the purge conduit and positioned to control a purge pressure associated with the purge fluid in the purge conduit. The dispensing assembly also may include a first flush inlet associated with the support and positioned to receive a first flush fluid from one or more of a first flush fluid source or a second flush fluid source, and a first flush conduit connected to the first flush inlet and positioned to receive a flow of the first flush fluid and provide fluid flow between the first flush inlet and the sample cylinder. The dispensing assembly also may include a first flush valve connected to the first flush conduit and positioned to switch between a closed condition blocking flow of the first flush fluid from one or more of the first flush fluid source or the second flush fluid source and an open condition allowing flow of the first flush fluid from one or more of the first flush fluid source or the second flush fluid source through the first flush valve. The dispensing assembly further may include an inlet conduit connected to the front side of the support and one or more of the purge conduit or the first flush conduit and positioned provide fluid flow to the sample cylinder, and an inlet valve connected to the inlet conduit and positioned to switch between a closed condition blocking flow of fluid to the sample cylinder and an open condition allowing flow of fluid through the inlet valve to the sample cylinder. The dispensing assembly also may include an inlet conduit connector connected to the inlet valve and positioned to be connected to the sample cylinder to provide fluid flow to the sample cylinder, and an outlet conduit connected to the front side of the support and positioned to provide fluid flow between the sample cylinder and a sample receptacle positioned to receive the sample fluid. The dispensing assembly also may include an outlet conduit connector connected to the outlet conduit and positioned to be connected to the sample cylinder to provide fluid flow from the sample cylinder, and an outlet valve connected to the outlet conduit and positioned to switch between a closed condition blocking flow of fluid from the sample cylinder and an open condition allowing flow of fluid through the outlet valve from the sample cylinder to the sample receptacle. The dispensing assembly further may include a second flush inlet associated with the support and positioned to receive a second flush fluid from a third flush fluid source, and a second flush conduit connected to the second flush inlet and positioned to receive a flow of the third flush fluid and provide fluid flow between the second flush inlet and the sample cylinder. The dispensing assembly also may include a second flush valve connected to the second flush conduit and positioned to switch between a closed condition blocking flow of the second flush fluid from the third flush fluid source and an open condition allowing flow of the second flush fluid from the third flush fluid source through the second flush valve.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
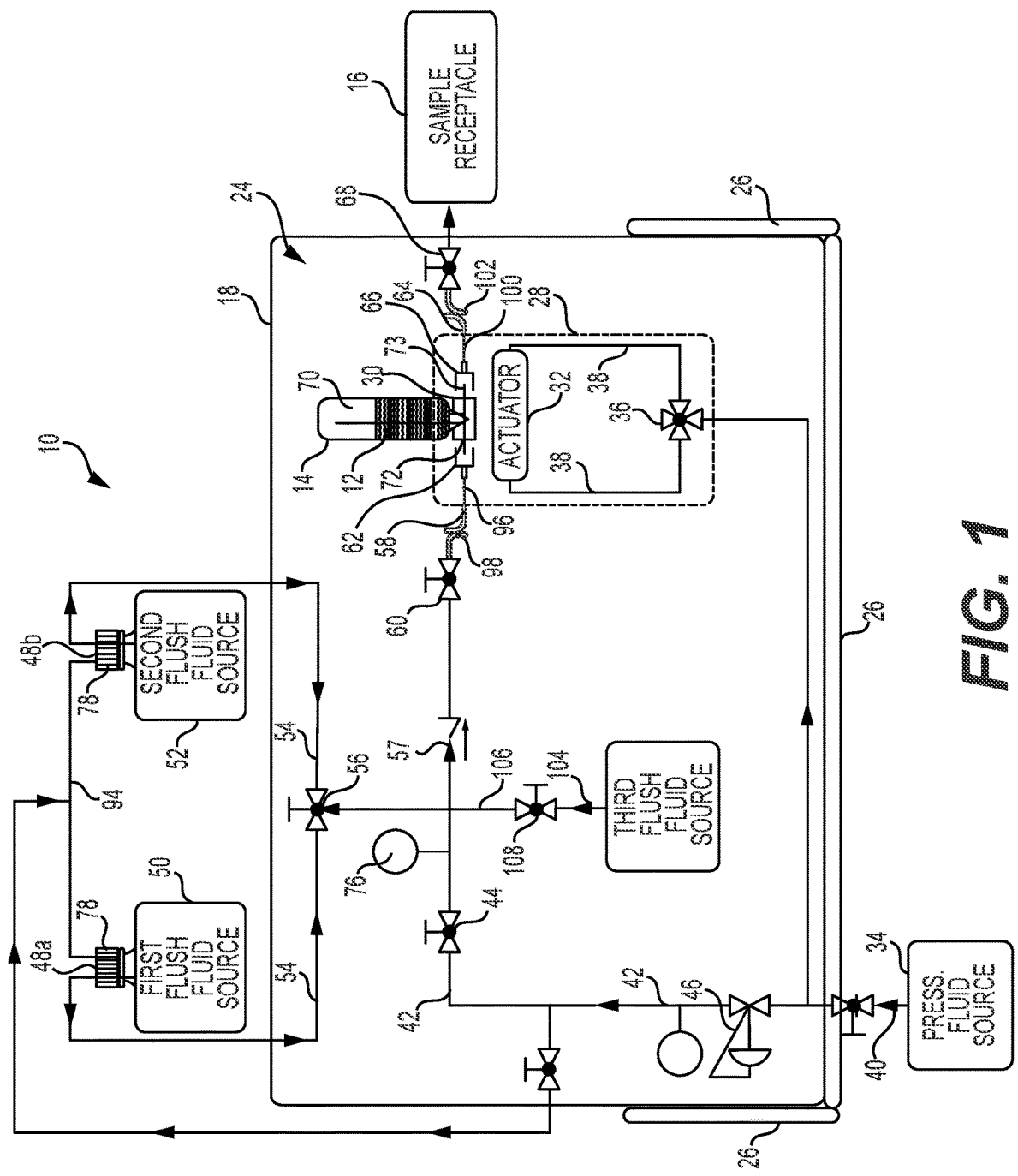
FIG. 1 schematically illustrates an example dispensing assembly for dispensing a fluid sample from an example sample cylinder according to embodiments of the disclosure.

FIG. 1 schematically illustrates an example dispensing assembly 10 for dispensing a fluid sample 12 from an example sample cylinder 14 according to embodiments of the disclosure. For example, the dispensing assembly 10 may be used to dispense at least a portion of the fluid sample 12 from the sample cylinder 14 into a sample receptacle 16 positioned to receive the portion of the fluid sample 12. For example, the sample receptacle 16 may be used to provide the portion of the fluid sample 12 to a testing apparatus for determining one or more properties of the fluid sample 12, such as, for example, a titration apparatus. For example, the sample cylinder 14 may be used to collect the fluid sample 12 from a petroleum refining process, such as an alkylation process, as will be understood by those skilled in the art. The sample cylinder 14 may be configured to safely contain the fluid sample 12, preventing unintended release of any of the fluid sample 12 into the surroundings. For example, the fluid sample 12 may contain a catalyst for the alkylation process, such as hydrofluoric acid, aluminum chloride, or sulfuric acid, and the sample cylinder 14 may be configured to prevent unintended release of the fluid sample 12, and the dispensing assembly 10 may be configured to open the sample cylinder 14 and facilitate extraction of, in a controlled manner, at least a portion of the fluid sample 12 from the sample cylinder 14 to provide the portion of the fluid sample 12 into the sample receptacle 16 for testing using known testing methods to determine one or more material properties of the fluid sample 12, such as, for example, acid strength and/or moisture content. In some embodiments, the dispensing assembly 10 may be configured to perform these tasks without releasing any of the fluid sample 12 to the surrounding environment, which may be important for fluid samples containing certain types of substances that may be volatile and/or toxic. Other types of fluids from other types of processes are contemplated, as well as other testing methods and other material properties, as will be understood by those skilled in the art.

In some embodiments, as shown in FIGS. 1, 2A, 2B, 4, 5A, 5B, and 5C, the dispensing assembly 10 may include a support 18 defining a front side 20 and a back side 22. The support 18, in some embodiments, may include a panel 24 and one or more stabilizers 26 located at a lower portion of the support 18 and configured to stabilize the support 18 on, for example, a horizontal surface, such as a laboratory counter. In some embodiments, the support 18 may include one or more housings configured to cover and/or protect one or more components of the dispensing assembly 10.

As schematically shown in FIG. 1, some embodiments of the dispensing assembly 10 may include a sample fixture assembly 28 connected to the front side 20 of the support 18 and configured to receive the sample cylinder 14 containing the fluid sample 12. For example, the sample fixture assembly 28 may include a bracket 30 configured to receive and engage the sample cylinder 14 to secure the sample cylinder 14 and prevent movement of the sample cylinder 14 during dispensing of the fluid sample 12, as will be understood by those skilled in the art. The sample fixture assembly 28 also may include an actuator 32 connected to the bracket 30 and configured to open the sample cylinder 14 when activated. For example, the actuator 32 may be a pneumatically operated actuator, which may be controlled by a pressurized fluid source 34 and a control valve 36 via pneumatic lines 38. For example, the actuator 32 may be a cylinder configured to reciprocate in response to operation of the control valve 36, which may be manually controlled or automatically controlled via a controller. Other types of actuators are contemplated, such as electric linear actuators and/or hydraulic actuators.

In some embodiments, as shown in FIG. 1, the dispensing assembly 10 may include a purge inlet 40 associated with the support 18 and configured to receive a purge fluid from the pressurized fluid source 34, and a purge conduit 42 connected to the purge inlet 40 to receive a flow of the purge fluid and provide fluid flow between the purge inlet 40 and the sample cylinder 14. The purge fluid may be used to purge material (liquids and/or solids) from one or more of the fluid conduits of the dispensing assembly 10 and/or from the sample cylinder 14 following dispensing of the fluid sample 12 to the sample receptacle 16. In some examples, the purge fluid may be nitrogen and/or an inert gas, although other purge fluids art contemplated.

The dispensing assembly 10, in some embodiments, may include a purge valve 44 connected to the purge conduit 42 and positioned to switch between a closed condition blocking flow of the purge fluid and an open condition allowing flow of the purge fluid through the purge valve 44 and the purge conduit 42. In some embodiments, the purge valve 44 may be a needle valve, although other valve types are contemplated. In some embodiments, the dispensing assembly 10 may include a purge regulator 46 connected the purge conduit 42 and positioned to control a purge pressure associated with the purge fluid in the purge conduit 42. For example, the purge pressure may range from about greater than about zero lbs./in² (psi) to about 15 psi (e.g., from greater than about zero psi to about 10 psi). In some embodiments, as check valve may be provided in the purge conduit 42, for example, to prevent fluid from flowing upstream toward the pressurized fluid source 34.

As schematically shown in FIG. 1, some embodiments of the dispensing assembly 10 may include a flush inlet 48 associated with the support 18 and configured to receive a flush fluid from one or more of a first flush fluid source 50 or a second flush fluid source 52. For example, as shown in FIG. 1, the dispensing assembly 10 may include a flush conduit 54 connected to the flush inlet 48 and positioned to receive a flow of the flush fluid and provide fluid flow between the flush inlet 48 and the sample cylinder 14. As shown in FIG. 1, some embodiments of the dispensing assembly 10 may include more than one flush inlet 48, such as a first flush inlet 48a configured to receive a flush fluid from the first flush fluid source 50 and a second flush inlet 48b configured to receive a flush fluid from the second flush fluid source 52. In some embodiments, the respective flush fluids from the first flush fluid source 50 and the second flush fluid source 52 may be different fluids (e.g., water and acetone), although in some embodiments, the flush fluid from each of the flush fluid sources may be the same. The flush fluid may be used to flush material (liquids and/or solids) from one or more of the fluid conduits of the dispensing assembly 10 and/or from the sample cylinder 14 following dispensing of the fluid sample 12 to the sample receptacle 16.

Figure 2A:
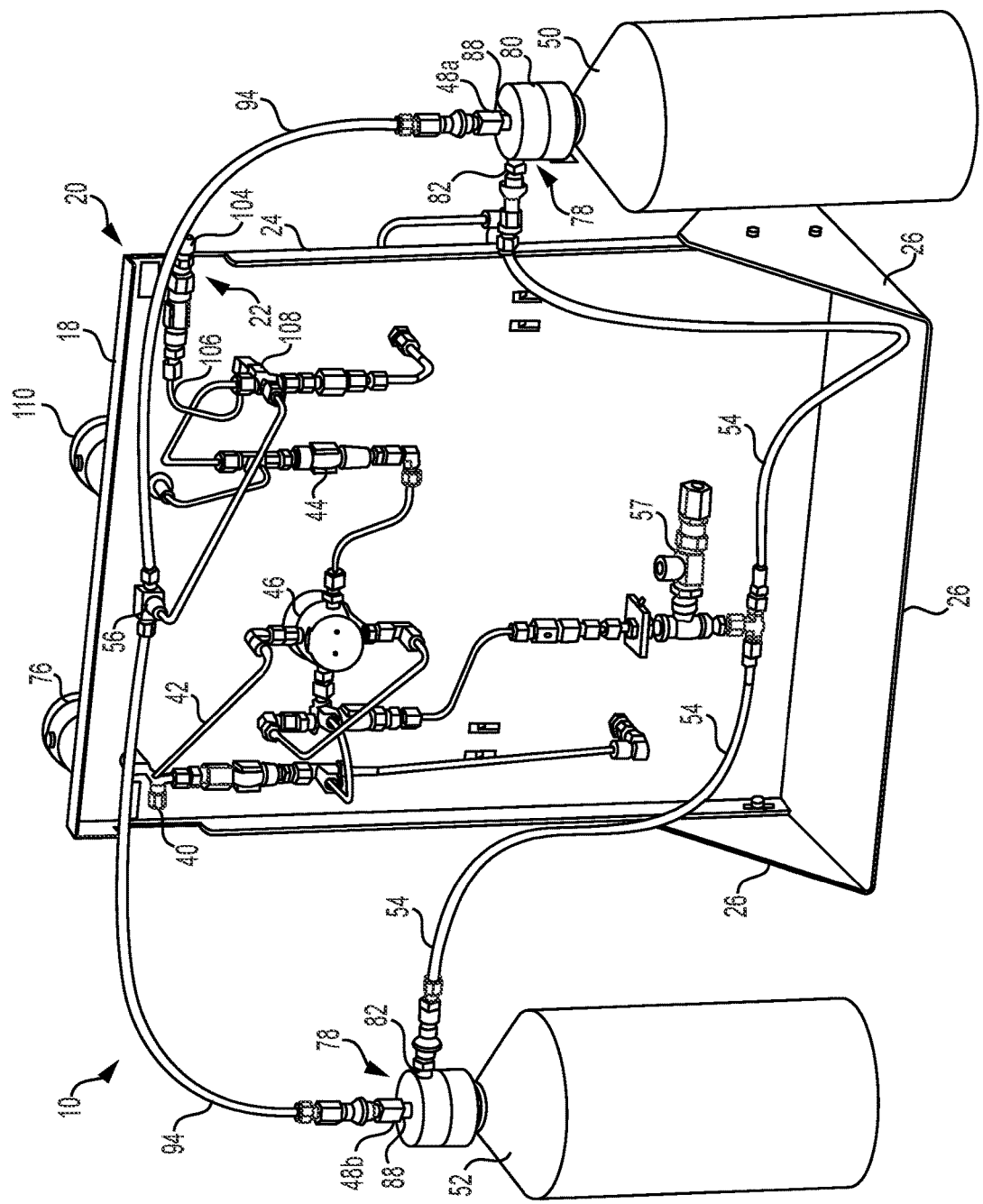
FIG. 2A is a rear perspective view of an example dispensing assembly according to embodiments of the disclosure.
Figure 2B:
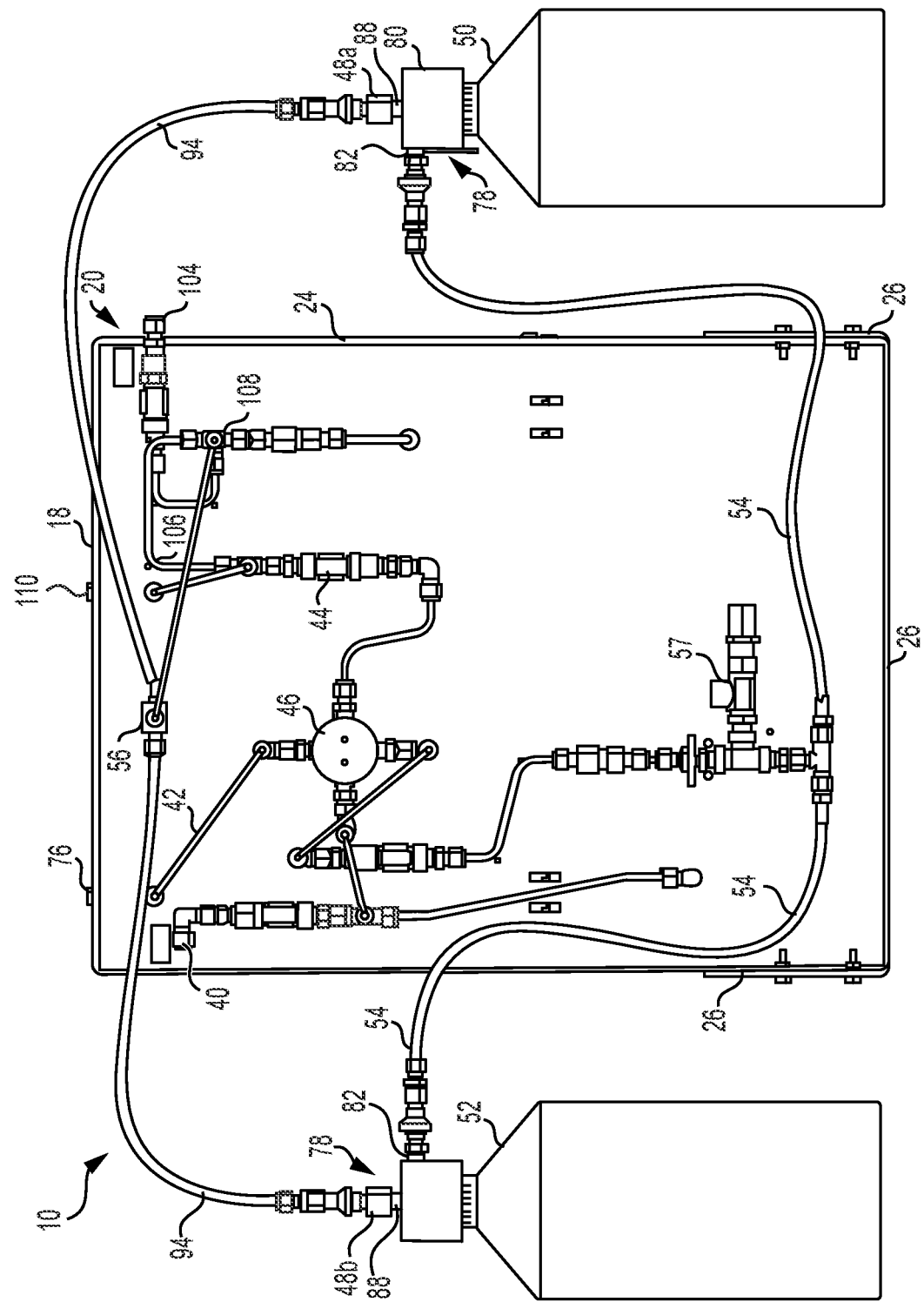
FIG. 2B is a rear view of the example dispensing assembly shown in FIG. 2A according to embodiments of the disclosure.

In some embodiments, the dispensing assembly 10 may include a flush valve 56 connected to the flush conduit 54 and positioned to switch between a closed condition blocking flow of the flush fluid from one or more of the first flush fluid source 50 or the second flush fluid source 52 and an open condition allowing flow of the flush fluid from one or more of the first flush fluid source 50 or the second flush fluid source 52 through the flush valve 56. In some embodiments, the flush valve 56 may be a selector valve, for example, such that the source of the flush fluid may be manually selected or automatically selected via control signals from a controller. In some embodiments, for example, as shown in FIGS. 2A and 2B, the dispensing assembly 10 may include a pressure control device 57 connected to the flush conduit 54 and configured to prevent pressure in the flush conduit 54 from damaging a container or receptacle associated with the first flush fluid source 50 or the second flush fluid source 52. In some embodiments, the pressure control device 57 may be a pressure relief device.

Figure 5A:
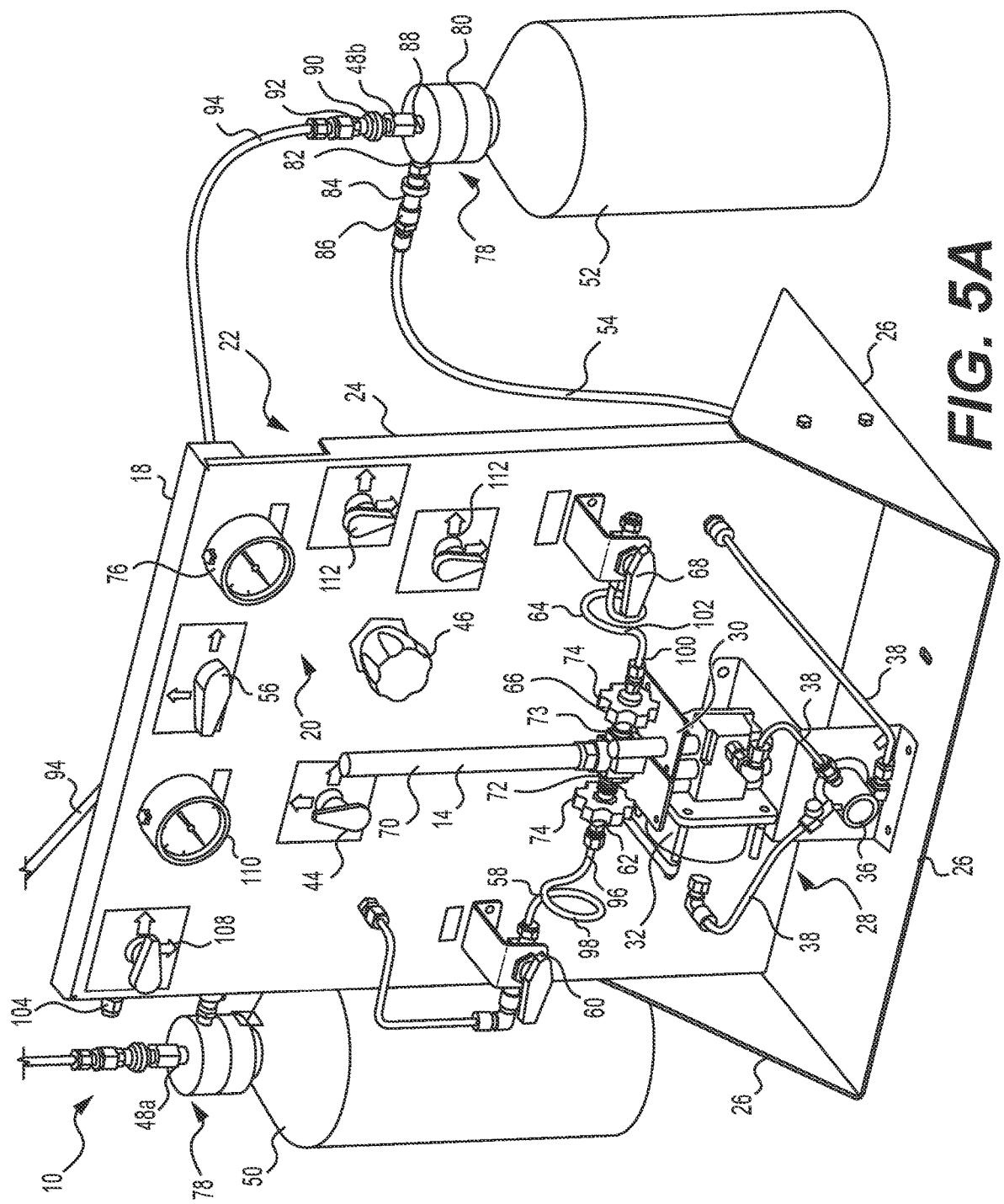
FIG. 5A is a front perspective view of an example dispensing assembly according to embodiments of the disclosure.
Figure 5B:
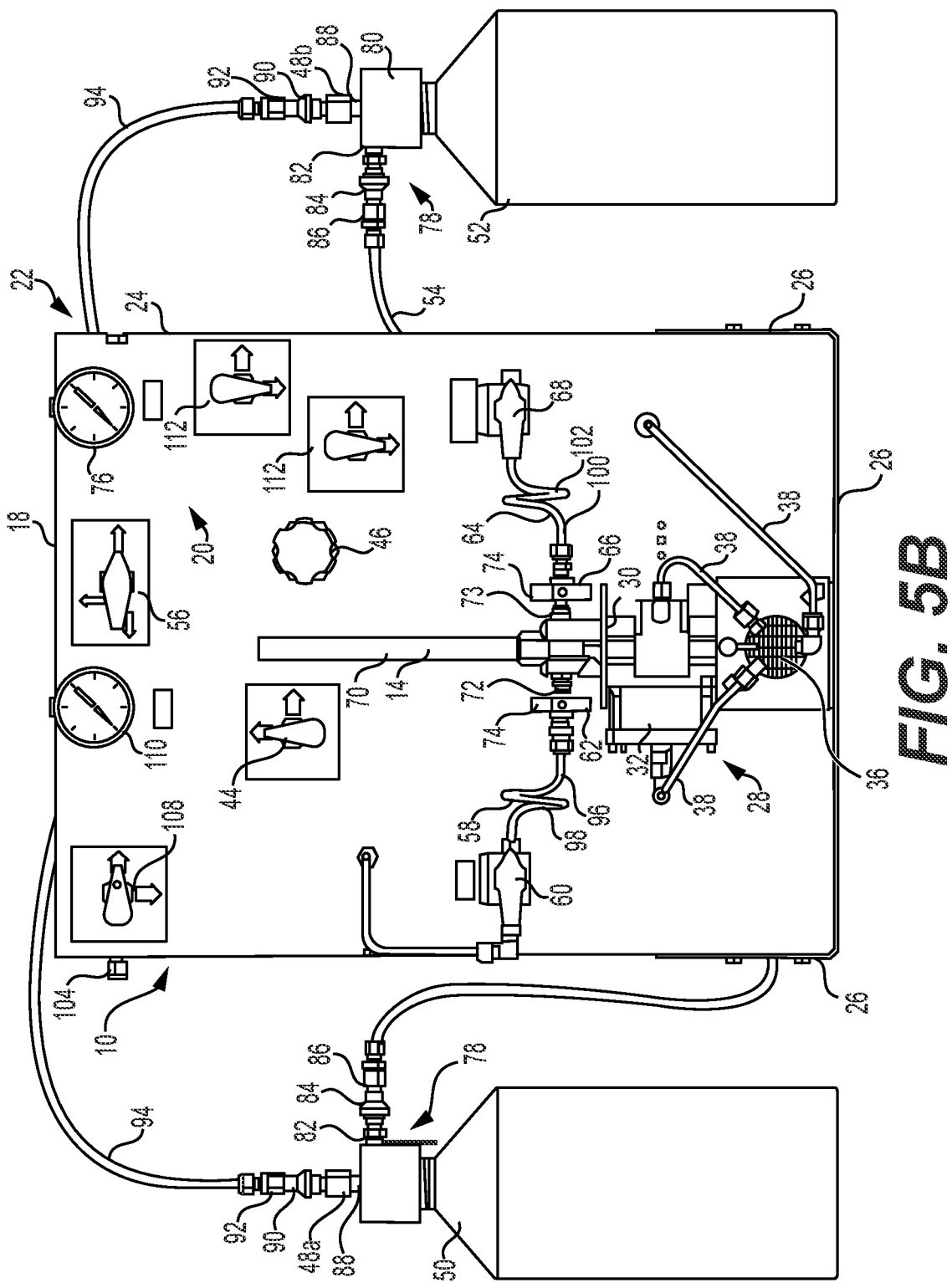
FIG. 5B is a front view of the example dispensing assembly shown in FIG. 5A according to embodiments of the disclosure.

As shown in FIGS. 1, 5A, and 5B, some embodiments of the dispensing assembly 10 may include an inlet conduit 58 connected to the front side 20 of the support 18 and one or more of the purge conduit 42 or the flush conduit 54 and configured to provide fluid flow to the sample cylinder 14. The dispensing assembly 10 may include an inlet valve 60 connected to the inlet conduit 58 and positioned to switch between a closed condition blocking flow of fluid to the sample cylinder 14 and an open condition allowing flow of fluid through the inlet valve 60 to the sample cylinder 14. The dispensing assembly 10 may include an inlet conduit connector 62 connected to the inlet valve 60 and positioned to be connected to the sample cylinder 14 to provide fluid flow to the sample cylinder 14. In some embodiments, the inlet valve 60 may be a block valve, although other valve types are contemplated.

The dispensing assembly 10, in some embodiments, may include an outlet conduit 64 connected to the front side 20 of the support 18 and positioned to provide fluid flow between the sample cylinder 14 and a sample receptacle 16 positioned to receive the sample fluid 12. The dispensing assembly 10 may include an outlet conduit connector 66 connected to the outlet conduit 64 and positioned to be connected to the sample cylinder 14 to provide fluid flow from the sample cylinder 14, and an outlet valve 68 connected to the outlet conduit 64 and configured to switch between a closed condition blocking flow of fluid from the sample cylinder 14 and an open condition allowing flow of fluid through the outlet valve 68 from the sample cylinder 14 to the sample receptacle 16. In some embodiments, the outlet valve 68 may be a block valve, a metering valve, or a needle valve. In some embodiments, one or more of the inlet conduit 58, the inlet valve 60, the inlet conduit connector 62, the outlet conduit 64, the outlet conduit connector 66, or the outlet valve 68 may be formed from, or include, Monel (e.g., Monel 400) or one or more other corrosion-resistant materials.

In some embodiments, the sample cylinder 14 may include a cylinder body 70 defining a longitudinal cylinder axis and a sample cylinder inlet coupling 72 and a sample cylinder outlet coupling 73, each having external threading configured to be threadedly engaged with the inlet conduit connector 62 and the outlet conduit connector 66, respectively, to provide fluid flow from the inlet conduit 58 through the inlet conduit connector 62, through the sample cylinder inlet coupling 72 of the sample cylinder 14, through the sample cylinder outlet coupling 73, through the outlet conduit connector 66, and through the outlet valve 68 (when open) to the sample receptacle 16. In some examples, the sample cylinder inlet coupling 72 and the sample cylinder outlet coupling 73 may define an axis substantially perpendicular to the longitudinal cylinder axis of the cylinder body. As shown in FIGS. 5A and 5B, in some embodiments, the inlet conduit connector 62 and/or the outlet conduit connector 66 may include a circumferential engagement surface 74 positioned to facilitate tightening by hand. For example, rather than merely having hexagonal flats as would be expected on a conduit connection nut, the circumferential engagement surface 74 of the inlet conduit connector 62 and/or the outlet conduit connector 66 may have a relatively large diameter that may be more easily grasped by a person, for example, wearing bulky, protective gloves.

As schematically depicted in FIG. 1, in some embodiments, the dispensing assembly 10 may include a sensor 76 associated with the support 18 and viewable from the front side 20 of the support 18. For example, the sensor 76 may be connected to one or more of the flush conduit 54 or the inlet conduit 58 and positioned to provide an indication of a leak in the one or more of the flush conduit 54 or the inlet conduit 58. In some embodiments, the sensor 76 may be configured to provide an audible leak indication, a tactile (e.g., vibratory) leak indication, and/or a signal (e.g., an electrical signal) indicative of a leak. In some embodiments, the sensor 76 may be a pressure gauge configured to provide a visual indication of the pressure in the flush conduit 54 and/or the inlet conduit 58. This may be important, for example, if the fluid sample 12 contains a volatile or toxic substance.

Figure 3:
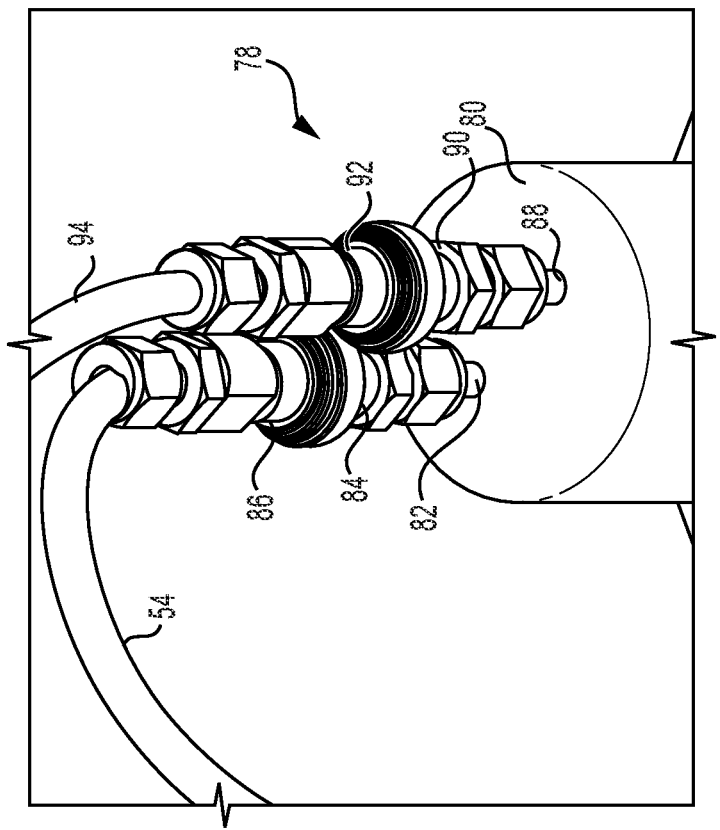
FIG. 3 is a partial perspective view of an example flush inlet connected to an example flush fluid source according to embodiments of the disclosure.

As shown in FIGS. 2A, 2B, and 3, in some embodiments, the flush inlet 48 may include a cap assembly 78 configured to engage with a flush fluid source. For example, the flush fluid source may include a bottle or other receptacle type having an opening provided with an engageable structure or surface such as helical threading. The cap assembly 78 may include a cap body 80 configured to be engaged with the engageable structure or surface of flush fluid source. For example, the cap body 80 may include helical threads complimentary to helical threads of the flush fluid source bottle or receptacle. Other types of engagement are contemplated. In some embodiments, the cap body may be configured to engage a bottle or receptacle received from a manufacturer or distributor of the flush fluid contained in the bottle or receptacle. This may render it relatively easier to replace an empty (or low) bottle or receptacle with another bottle or receptacle having more flush fluid, eliminating a need to refill the original bottle or receptacle. This may be particularly helpful for a person wearing bulky, protective gloves.

In some embodiments, as shown in FIG. 3, the cap assembly 78 may include a first cap conduit 82 configured to provide fluid flow between the flush fluid source and the flush conduit 54. In some embodiments, the cap assembly 78 may also include a first quick connect coupler 84 connected to the first cap conduit 82 and configured to be connected to a second quick connect coupler 86 connected to the flush conduit 54, for example, as shown in FIG. 3. In some embodiments, the cap assembly 78 may further include a second cap conduit 88 positioned provide fluid flow between either of the flush fluid sources 50 or 52 and the pressurized fluid source 34 (see, e.g., FIG. 1). In some such embodiments, the cap assembly 78 also may include a third quick connect coupler 90 connected to the second cap conduit 88 and configured to be connected to a fourth quick connect coupler 92 connected to a transfer conduit 94 connected to one or more of the pressurized fluid source 34 or one of the flush fluid sources 50 or 52. In some embodiments, one or more of the cap conduits or the transfer conduit 94 may be formed from flexible tubing, rendering it relatively easier to replace bottles or receptacles that contain the flush fluid, particularly when a person is wearing bulky, protective gloves. Although in the example shown in FIG. 3, the first cap conduit 82 and the second cap conduit 88 are substantially parallel to one another, in some embodiments the first cap conduit 82 and the second cap conduit 88 may be transverse to one another (e.g., substantially perpendicular to one another), for example, as shown in FIG. 2A. In some embodiments having two flush fluid sources, for example, as shown in FIGS. 1, 2A, and 2B, each of the fluid sources may include similar cap assemblies. In some embodiments, an ability to more easily disconnect the cap conduits from the cap body 80 may facilitate more easily unscrewing the cap body 80 from the bottle or receptacle, as compared to an arrangement in which the bottle or receptacle must be unscrewed from the cap.

FIGS. 5A and 5B are a front perspective view and front view of an example dispensing assembly 10 according to embodiments of the disclosure. As shown in FIGS. 5A and 5B, in some embodiments, the first flush fluid source 50 and the second flush fluid source 52 are both viewable and accessible from the front side 20 of the support 18. This may render it relatively more easy to replace or refill the fluid sources, for example, as compared to an arrangement where the fluid sources are positioned behind the support 18.

Figure 5C:
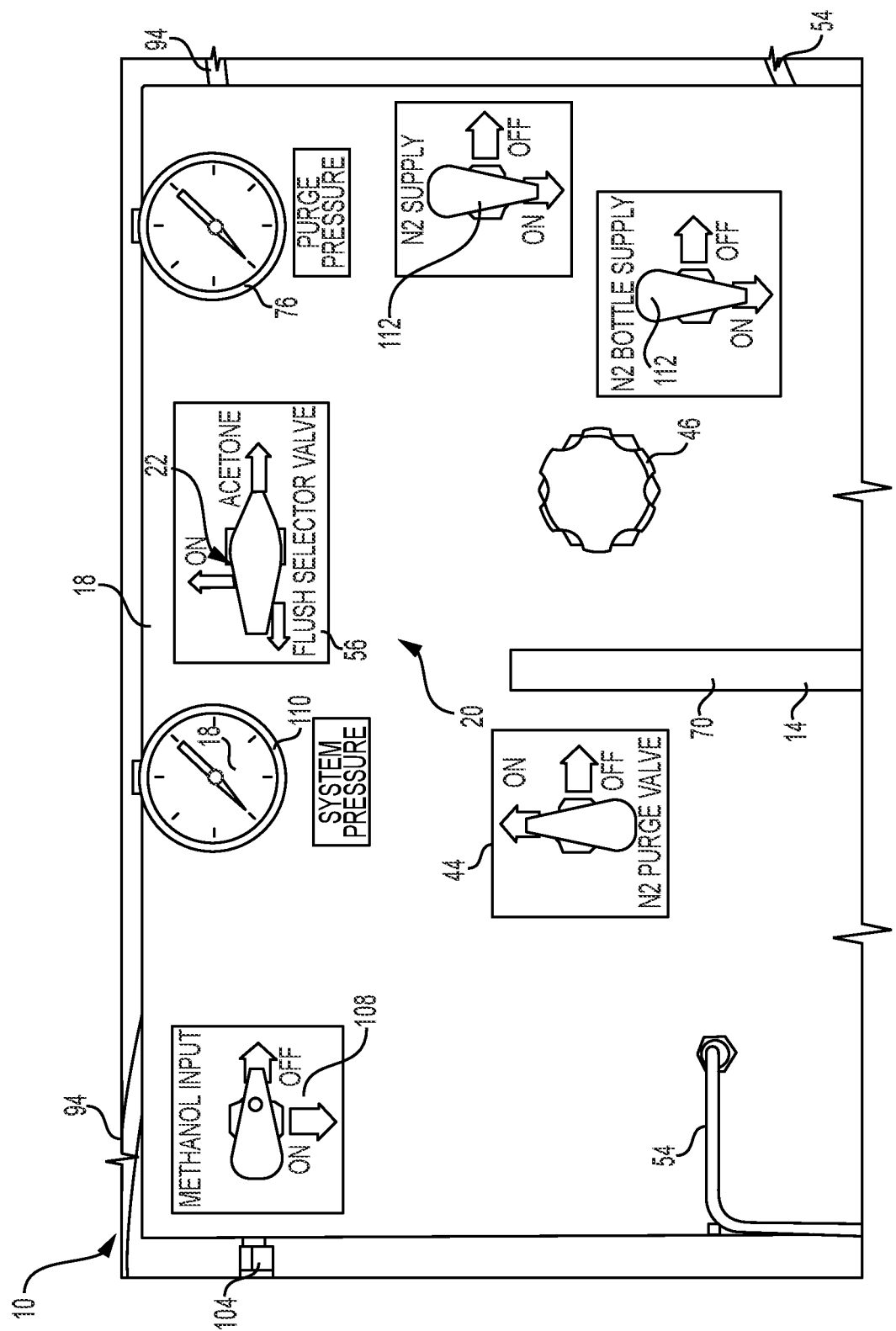
FIG. 5C is a partial front view of the example dispensing assembly shown in FIG. 5A according to embodiments of the disclosure.

As shown in FIG. 1, in some embodiments, the purge regulator 46 may be connected to the purge conduit 42 and positioned to regulate pressure in the purge conduit 42, with the purge regulator 46 being connected to the support 18. As shown in FIGS. 5A, 5B, and 5C, in some embodiments, the purge regulator 46 is accessible from the front side 20 of the support 18. This may render it relatively easier for a person to adjust the purge regulator 46 from the front side 20 of the support 18.

As shown in FIGS. 5A and 5B, in some embodiments, the inlet conduit 58 may include a straight inlet segment 96 defining an inlet conduit axis, and the straight inlet segment 96 may be being connected to the inlet conduit connector 62. The inlet conduit 58, in some embodiments, may also include a curved inlet segment 98 connected to the flush conduit 54 and the straight inlet segment 96. The curved inlet segment 98 and the straight inlet segment 96 may be configured such that the inlet conduit axis remains substantially parallel to a cylinder inlet axis of the sample cylinder inlet coupling 72 of the sample cylinder 14 as the curved inlet segment 98 flexes. In some embodiments, the curved inlet segment 98 may at least partially define a loop substantially perpendicular to the inlet conduit axis, and the curved inlet segment 98 may be connected to the flush conduit 54 via the inlet valve 60. In some embodiments, straight inlet segment 96 and/or the curved inlet segment 98 may form a "pigtail" configuration.

In some embodiments, the outlet conduit 64 may include a straight outlet segment 100 defining an outlet conduit axis, and the straight outlet segment 100 may be connected to the outlet conduit connector 66. The outlet conduit 64 may also include a curved outlet segment 102 connected to the straight outlet segment 100 and the outlet valve 68. In some embodiments, the curved outlet segment 102 and the straight outlet segment 100 may be configured such that the outlet conduit axis remains substantially parallel to a cylinder outlet axis of the sample cylinder outlet coupling 73 of the sample cylinder 14 as the curved outlet segment 102 flexes. In some embodiments, the curved outlet segment 102 may at least partially define a loop substantially perpendicular to the outlet conduit axis. In some embodiments, straight outlet segment 100 and/or the curved outlet segment 102 may form a "pigtail" configuration.

Figure 4:
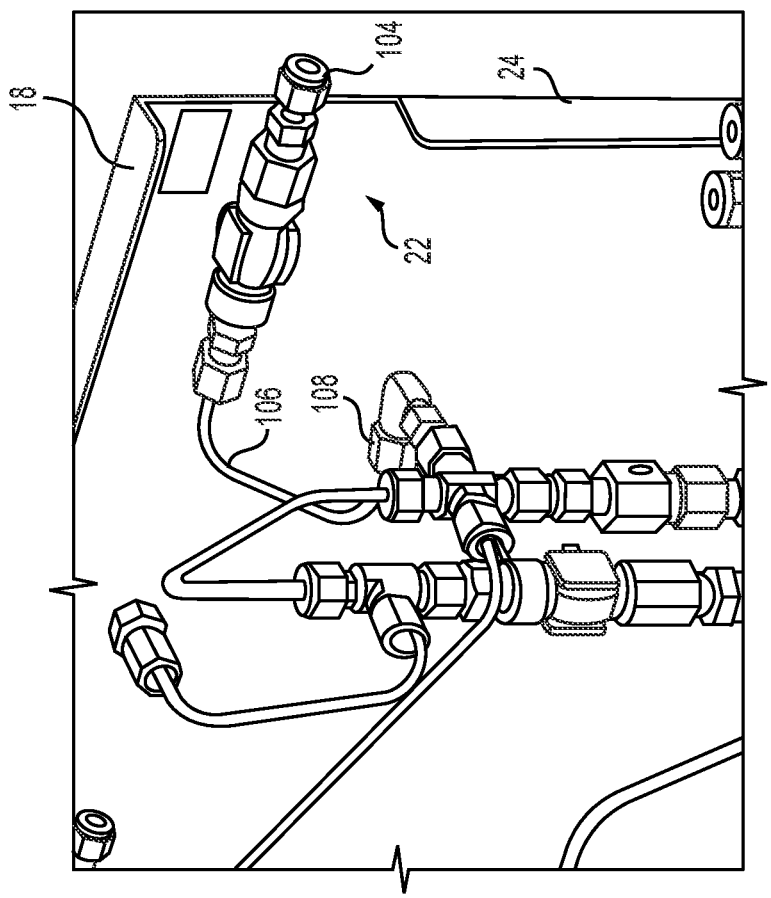
FIG. 4 is a partial perspective view of another example flush inlet connected to a back side of an example support of a dispensing assembly according to embodiments of the disclosure.

As shown in FIGS. 2A, 2B, and 4, in some embodiments, the dispensing assembly 10 may include an additional flush inlet 104 associated with the support 18 and configured to receive an additional flush fluid from an additional flush fluid source. Some such embodiments may include an additional flush conduit 106 connected to the additional flush inlet 104 and configured to receive a flow of the additional flush fluid and provide fluid flow between the additional flush inlet 104 and the sample cylinder 14. Some embodiments also may include an additional flush valve 108 connected to the additional flush conduit 106 and configured to switch between a closed condition blocking flow of the additional flush fluid from the additional lush fluid source and an open condition allowing flow of the additional flush fluid through the additional flush valve 108. In some embodiments, a quick connect coupler may be connected to the additional flush inlet 104 and positioned to be connected to another quick connect coupler connected to the additional flush fluid source. The additional flush fluid may be, for example, methanol, although other flush fluids are contemplated. For example, in some embodiments, methanol may be used in association with moisture content testing.

FIG. 5C is a partial front view of the example dispensing assembly 10 shown in FIG. 5A according to embodiments of the disclosure. As shown in FIG. 5C, some embodiments of the dispensing assembly 10 may include a pressure gauge 110 configured to show the pressure in the pneumatic system (e.g., the system supplying pressure to the sample fixture assembly 28, the purge conduit 42, and/or the flush conduit 54), which may be supplied with, for example, pressurized fluid, such as nitrogen or another gas (e.g., from the pressurized fluid source 34 (FIG. 1)). The pressure in pneumatic system may be controlled via adjustment of the purge regulator 46. As shown in FIG. 5C, the dispensing assembly 10 may include one or more selectors 112 for selecting the source of pressurized fluid (e.g., nitrogen), for example, from a bottle or a pressurized fluid line at the location of the dispensing assembly 10. The selectors 112 may be connected to selector valves configured to either connect or disconnect the source of pressurized fluid as will be understood by those skilled in the art.

Figure 6A:
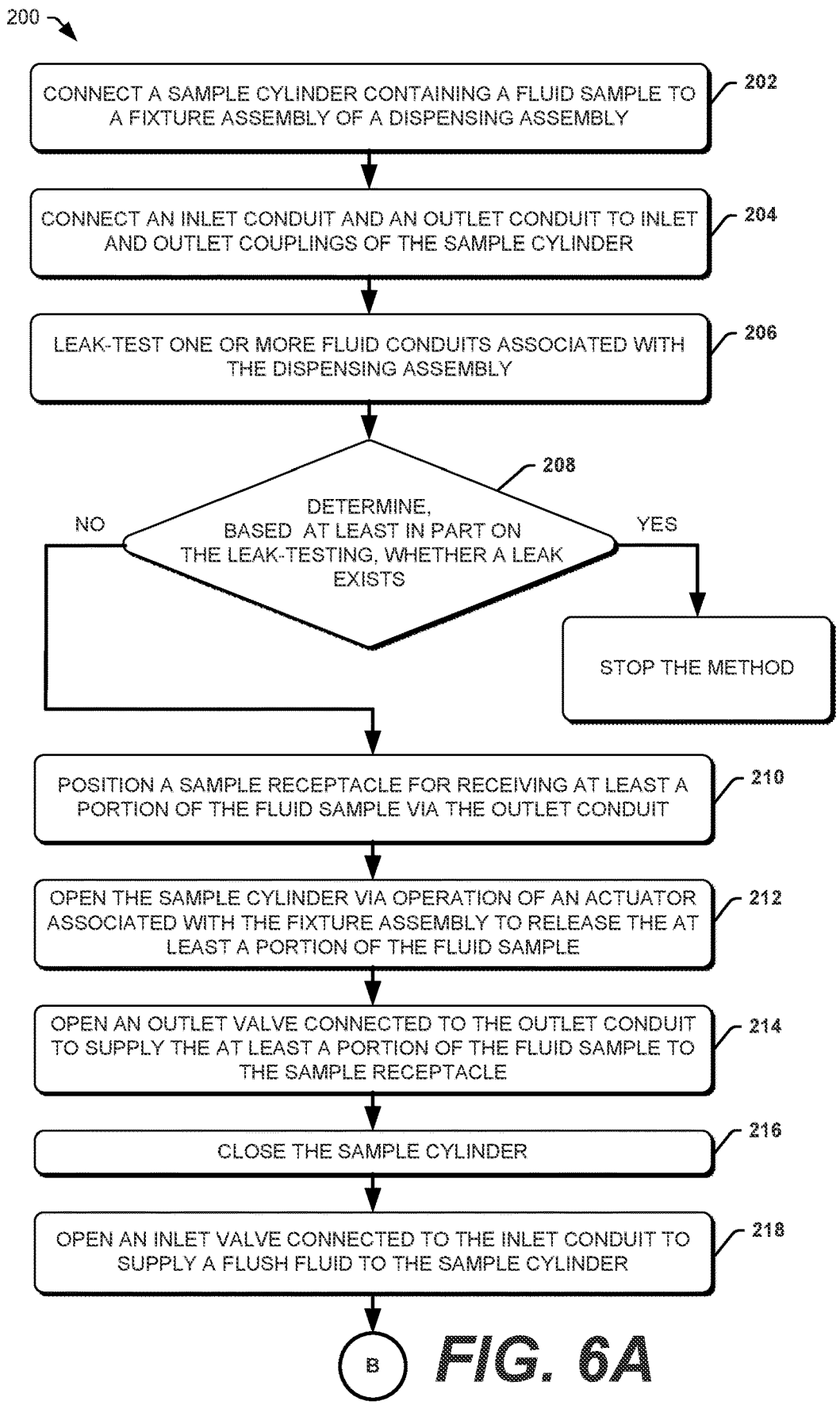
FIG. 6A is a block diagram of an example method for operating a dispensing assembly to facilitate dispensing of a fluid sample from a sample cylinder, according to embodiments of the disclosure.
Figure 6B:
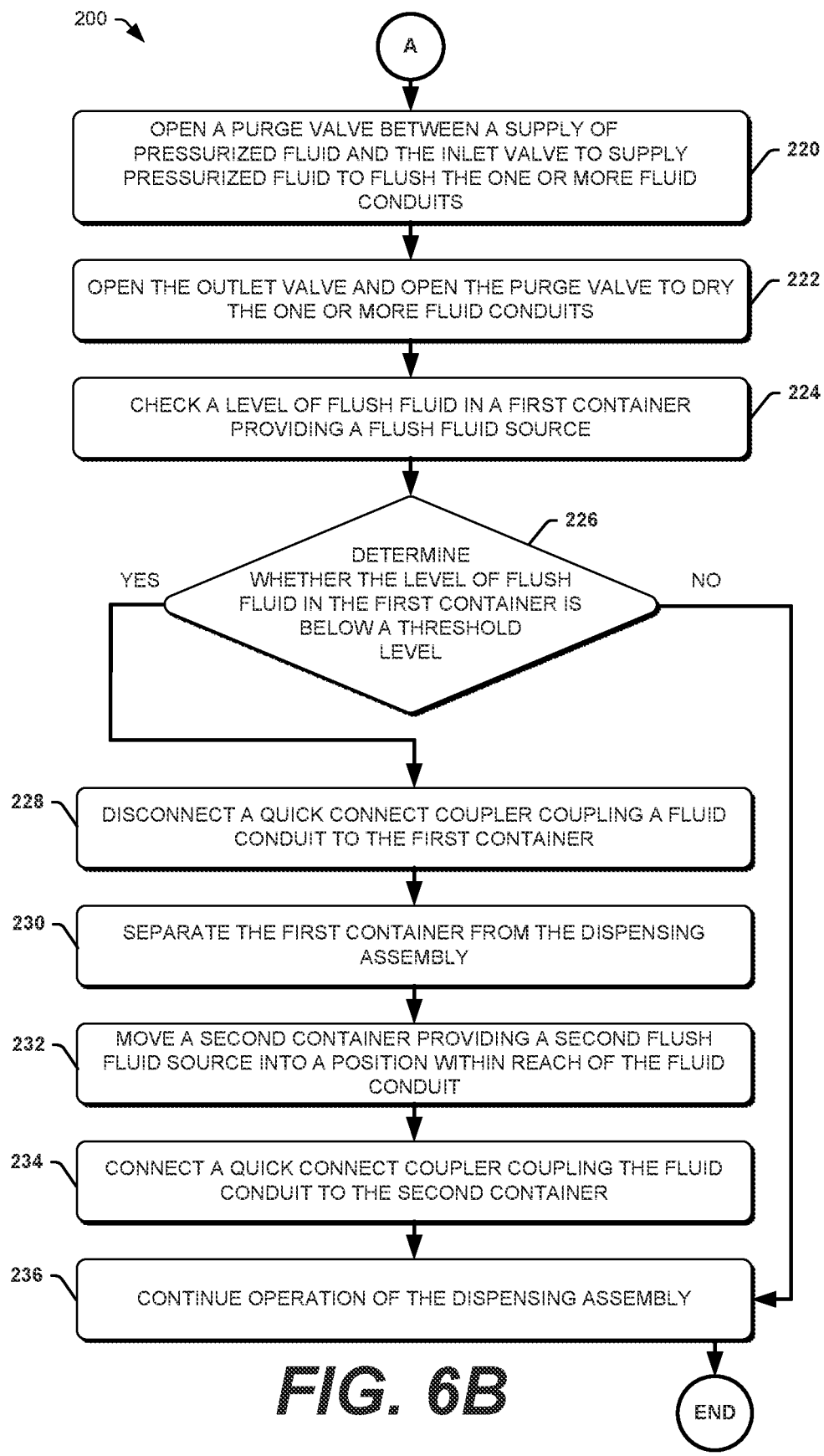
FIG. 6B is a continuation of the block diagram shown in FIG. 6A, according to embodiments of the disclosure.

FIG. 6A and FIG. 6B are a block diagram of an example method 200 for operating a dispensing assembly to facilitate dispensing of a fluid sample from a sample cylinder, according to embodiments of the disclosure. The example method 200 is illustrated as collections of blocks in a logical flow graph, which represent a sequence of operations. In the context of software, where applicable, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIGS. 6A and 6B are a block diagram of an example method 200 for operating a dispensing assembly to facilitate dispensing of a fluid sample from a sample cylinder, according to embodiments of the disclosure. At 202, the example method 200 may include connecting a sample cylinder containing a fluid sample to a fixture assembly of the dispensing assembly, for example, as described herein. The fixture assembly may be positioned to secure the sample cylinder and facilitate extraction of at least a portion of the fluid sample from the sample cylinder.

At 204, the example method 200 may include connecting an inlet conduit and an outlet conduit to inlet and outlet couplings of the sample cylinder, for example, as described herein.

The example method 200, at 206, may include leak-testing one or more fluid conduits associated with the dispensing assembly, for example, as described herein. For example, leak-testing the one or more fluid conduits may include opening an inlet valve connected to the inlet conduit to supply one or more of a flush fluid or a purge fluid to the sample cylinder, and opening a purge valve between a supply of pressurized fluid and the inlet valve to supply pressurized fluid to the sample cylinder. The leak-testing may further include monitoring a sensor connected to the one or more fluid conduits. The sensor may be positioned to provide an indication of a leak in the one or more fluid conduits. In some embodiments, monitoring the sensor may include monitoring a pressure gauge to identify whether pressure in the one or more fluid conduits is one or more of below a threshold pressure or dropping.

At 208, the example method 200 may include determining, based at least in part on the leak-testing, whether a leak exists.

If, at 208, it is determined that a leak exists, the example method 200 may include discontinuing the method 200, for example, until any leaks may be corrected.

If, at 208, it is determined that no leak exists, the example method 200, at 210, may include positioning a sample receptacle for receiving the at least a portion of the fluid sample via the outlet conduit, for example, as described herein.

At 212, the example method 200 may include opening the sample cylinder via operation of an actuator associated with the fixture assembly to release the at least a portion of the fluid sample, for example, as described herein.

The example method 200, at 214, may include opening an outlet valve connected to the outlet conduit to supply the at least a portion of the fluid sample to the sample receptacle, for example, as described herein.

At 216, the example method 200 may include closing the sample cylinder, for example, either manually or via an actuator associated with the fixture assembly.

The example method 200, at 218, may include opening an inlet valve connected to the inlet conduit to supply a flush fluid to the sample cylinder.

At 220, the example method 200 may include opening the purge valve between the supply of pressurized fluid and the inlet valve to supply pressurized fluid to flush the one or more fluid conduits.

At 222, the example method 200 may include opening the outlet valve and opening the purge valve to dry the one or more fluid conduits.

The example method 200, at 224, may include checking a level of flush fluid in a first container providing a flush fluid source.

At 226, the example method 200 may include determining whether the level of flush fluid in the first container is below a threshold level.

If, at 226, it is determined that the level of flush fluid in the first container is below the threshold level, at 228, the example method 200 may include disconnecting a quick connect coupler coupling a fluid conduit to the first container.

At 230, the example method 200 may include separating the first container from the dispensing assembly.

At 232, the example method 200 may include moving a second container providing a second flush fluid source into a position within reach of the fluid conduit.

The example method 200, at 234, may include connecting a quick connect coupler coupling the fluid conduit to the second container and, at 236, continuing operation of the dispensing assembly.

If, at 226, it is determined that the level of flush fluid in the first container is not below the threshold level, the example method 200 may include, at 236, continuing operation of the dispensing assembly.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This U.S. Non-Provisional patent application claims priority to and the benefit of U.S. Provisional Application No. 63/261,874, filed Sep. 30, 2021, titled "DISPENSING ASSEMBLY TO FACILITATE DISPENSING OF FLUID FROM A SAMPLE CYLINDER AND RELATED METHODS," and U.S. Provisional Application No. 63/261,566, filed Sep. 23, 2021, titled "DISPENSING ASSEMBLY TO FACILITATE DISPENSING OF FLUID FROM A SAMPLE CYLINDER AND RELATED METHODS," the disclosures of which are incorporated herein.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiments, and numerous variations, modifications, and additions further may be made thereto without departing from the spirit and scope of the present disclosure as set forth in the appended claims.

What is claimed is:

1. A dispensing assembly to facilitate dispensing of a fluid from a sample cylinder, the dispensing assembly comprising:
   a support;
   a sample fixture assembly connected to the support and positioned to receive a sample cylinder containing a fluid sample;
   a purge conduit positioned to receive a flow of a purge fluid and provide fluid flow to the sample cylinder;
   a flush conduit positioned to receive a flow of a flush fluid and provide fluid flow to the sample cylinder;
   an inlet conduit connected to one or more of the purge conduit or the flush conduit and positioned provide fluid flow to the sample cylinder; and
   a sensor connected to one or more of the purge conduit, the flush conduit, or the inlet conduit and positioned to provide an indication of a leak in the one or more of the purge conduit, the flush conduit, or the inlet conduit.

2. The dispensing assembly of claim 1, wherein the sensor comprises a pressure gauge.

3. The dispensing assembly of claim 1, further comprising a flush inlet connected to the flush conduit, associated with the support, and positioned to receive a flush fluid from one or more of a first flush fluid source or a second flush fluid source, the flush inlet including a cap assembly comprising:
   a cap body positioned to be engaged with the one or more of the first flush fluid source or the second flush fluid source;
   a first cap conduit positioned provide fluid flow between the first flush fluid source and the flush conduit; and
   a first quick connect coupler connected to the first cap conduit and positioned to be connected to a second quick connect coupler connected to the flush conduit.

4. The dispensing assembly of claim 3, wherein the flush inlet further comprises:
   a second cap conduit fluid flow between the first flush fluid source and one or more of a first pressurized fluid source or the second flush fluid source; and
   a quick connect coupler connected to the second cap conduit and positioned to be connected to another quick connect coupler, the another quick connect coupler being connected to a transfer conduit, the transfer conduit being connected to the one or more of the first pressurized fluid source or the second flush fluid source.

5. The dispensing assembly of claim 4, wherein one or more of the flush conduit or the transfer conduit comprise flexible tubing.

6. The dispensing assembly of claim 3, wherein the flush inlet is a first flush inlet positioned to receive a first flush fluid from the first flush fluid source, and the dispensing assembly further comprises a second flush inlet associated with the support and positioned to receive a second flush fluid from the second flush fluid source.

7. The dispensing assembly of claim 6, wherein the second flush inlet comprises a second cap assembly comprising:
  a second cap body positioned to be engaged with the second flush fluid source;
  a third cap conduit positioned provide fluid flow between the second flush fluid source and the flush conduit; and
  an additional quick connect coupler connected to the third cap conduit.

8. The dispensing assembly of claim 7, wherein the flush inlet further comprises:
  a fourth cap conduit positioned provide fluid flow between the second flush fluid source and one or more of the first pressurized fluid source or the second flush fluid source; and
  yet another quick connect coupler connected to the fourth cap conduit.

9. The dispensing assembly of claim 3, wherein the first flush fluid source supplies a first flush fluid and the second flush fluid source supplies a second flush fluid, and the first flush fluid and the second flush fluid comprise different components.

10. The dispensing assembly of claim 3, wherein one or more of the first flush fluid source or the second flush fluid source is viewable from the front side of the support.

11. The dispensing assembly of claim 1, further comprising the purge regulator is connected to the purge conduit and positioned to regulate pressure in the purge conduit, the purge regulator being connected to the support, such that the purge regulator is accessible from the front side of the support.

12. The dispensing assembly of claim 1, wherein the inlet conduit comprises:
  a straight inlet segment defining an inlet conduit axis, the straight inlet segment being connected to the inlet conduit connector; and
  a curved inlet segment connected to the flush conduit and the straight inlet segment, the curved inlet segment and the straight inlet segment being positioned such that the inlet conduit axis remains substantially parallel to a cylinder inlet axis of a sample cylinder inlet coupling of the sample cylinder as the curved inlet segment flexes.

13. The dispending assembly of claim 12, wherein the curved inlet segment at least partially defines a loop substantially perpendicular to the inlet conduit axis.

14. The dispensing assembly of claim 12, wherein the curved inlet segment is connected to the flush conduit via an inlet valve.

15. The dispensing assembly of claim 1, further comprising an outlet conduit connected to a front side of the support and positioned to provide fluid flow between the sample cylinder and a sample receptacle positioned to receive the sample fluid, the outlet conduit comprising:
  a straight outlet segment defining an outlet conduit axis, the straight outlet segment being connected to the outlet conduit connector; and
  a curved outlet segment connected to the straight outlet segment and the outlet valve, the curved outlet segment and the straight outlet segment being positioned such that the outlet conduit axis remains substantially parallel to a cylinder outlet axis of a sample cylinder outlet coupling of the sample cylinder as the curved outlet segment flexes.

16. The dispending assembly of claim 15, wherein the curved outlet segment at least partially defines a loop substantially perpendicular to the outlet conduit axis.

17. The dispensing assembly of claim 15, wherein one or more of the inlet conduit connector or the outlet conduit connector comprises a circumferential engagement surface positioned to facilitate tightening by hand.

18. A dispensing assembly to facilitate dispensing of a fluid from a sample cylinder, the dispensing assembly comprising:
  a support;
  a sample fixture assembly connected to the support and positioned to receive a sample cylinder containing a fluid sample;
  an inlet conduit connector positioned to be connected to the sample cylinder to provide fluid flow to the sample cylinder, the inlet conduit comprising:
    a straight inlet segment defining an inlet conduit axis, the straight inlet segment being connected to the inlet conduit connector; and
    a curved inlet segment connected to the straight inlet segment, the curved inlet segment and the straight inlet segment being positioned such that the inlet conduit axis remains substantially parallel to a cylinder inlet axis of a sample cylinder inlet coupling of the sample cylinder as the curved inlet segment flexes.

19. The dispensing assembly of claim 18, further comprising an outlet conduit positioned to provide fluid flow between the sample cylinder and a sample receptacle positioned to receive the sample fluid, the outlet conduit comprising:
  a straight outlet segment defining an outlet conduit axis, the straight outlet segment being connected to an outlet conduit connector; and
  a curved outlet segment connected to the straight outlet segment, the curved outlet segment and the straight outlet segment being positioned such that the outlet conduit axis remains substantially parallel to a cylinder outlet axis of a sample cylinder outlet coupling of the sample cylinder as the curved outlet segment flexes.

20. A method for operating a dispensing assembly to facilitate dispensing of a fluid from a sample cylinder, the method comprising:
  connecting a sample cylinder containing a fluid sample to a fixture assembly of the dispensing assembly, the fixture assembly being positioned to secure the sample cylinder and facilitate extraction of at least a portion of the fluid sample from the sample cylinder;
  connecting an inlet conduit and an outlet conduit to inlet and outlet couplings of the sample cylinder;
  leak-testing one or more fluid conduits associated with the dispensing assembly;
  positioning a sample receptacle for receiving the at least a portion of the fluid sample via the outlet conduit;
  opening the sample cylinder via operation of an actuator associated with the fixture assembly to release the at least a portion of the fluid sample; and
  opening an outlet valve connected to the outlet conduit to supply the at least a portion of the fluid sample to the sample receptacle.

21. The method of claim 20, wherein leak-testing the one or more fluid conduits comprises:
  opening an inlet valve connected to the inlet conduit to supply one or more of a flush fluid or a purge fluid to the sample cylinder;
  opening a purge valve between a supply of pressurized fluid and the inlet valve to supply pressurized fluid to the sample cylinder; and
  monitoring a sensor connected to the one or more fluid conduits, the sensor being positioned to provide an indication of a leak in the one or more fluid conduits.

22. The method of claim 21, wherein monitoring the sensor comprises monitoring a pressure gauge to identify whether pressure in the one or more fluid conduits is one or more of below a threshold pressure or dropping.

23. The method of claim 20, further comprising:
  closing the sample cylinder; and
  opening an inlet valve connected to the inlet conduit to supply a flush fluid to the sample cylinder.

24. The method of claim 23, further comprising opening the purge valve between the supply of pressurized fluid and the inlet valve to supply pressurized fluid to flush the one or more fluid conduits.

25. The method of claim 24, further comprising opening the outlet valve and opening the purge valve to dry the one or more fluid conduits.

26. The method of claim 20, further comprising:
  checking a level of flush fluid in a first container providing a flush fluid source;
  if the level of flush fluid in the first container is below a threshold level, disconnecting a quick connect coupler coupling a fluid conduit to the first container;
  separating the first container from the dispensing assembly;
  moving a second container providing a second flush fluid source into a position within reach of the fluid conduit; and
  connecting a quick connect coupler coupling the fluid conduit to the second container.

* * * * *